United States Patent
Wölfing et al.

(10) Patent No.: US 7,611,648 B2
(45) Date of Patent: Nov. 3, 2009

(54) METHOD FOR FORMING AN OPTICAL ELEMENT

(75) Inventors: Bernd Wölfing, Mainz (DE); Edgar Pawlowski, Stadecken-Elshelm (DE); Ulrike Stöhr, Mainz (DE); Ralf Biertümpfel, Mainz-Kastel (DE)

(73) Assignee: Schott AG, Mainz (DE)

( * ) Notice: Subject to any disclaimer, the term of this patent is extended or adjusted under 35 U.S.C. 154(b) by 710 days.

(21) Appl. No.: 11/115,415

(22) Filed: Apr. 27, 2005

(65) Prior Publication Data

US 2005/0249919 A1 Nov. 10, 2005

(30) Foreign Application Priority Data

Apr. 29, 2004 (DE) .................. 10 2004 021 215

(51) Int. Cl.
B29D 11/00 (2006.01)
(52) U.S. Cl. .................. 264/2.4; 65/102; 264/2.7; 425/808
(58) Field of Classification Search ............. 264/1.1, 264/1.7, 2.7, 2.2, 2.4, 2.3; 425/808; 65/64, 65/102
See application file for complete search history.

(56) References Cited

U.S. PATENT DOCUMENTS

| | | | |
|---|---|---|---|
| 5,436,764 A | 7/1995 | Umetani et al. | |
| 6,070,436 A | 6/2000 | Hirota et al. | |
| 6,305,194 B1 | 10/2001 | Budinski et al. | |
| 6,368,524 B1 | 4/2002 | Fujita et al. | |

FOREIGN PATENT DOCUMENTS

| | | |
|---|---|---|
| EP | 648712 B1 | 4/1995 |
| JP | 04187533 A | 7/1992 |
| JP | 2000053428 A | 2/2000 |
| JP | 2002-293553 A2 | 10/2002 |

OTHER PUBLICATIONS

Abstract of B1.

*Primary Examiner*—Mathieu D. Vargot
(74) *Attorney, Agent, or Firm*—Millen, White, Zelano & Branigan, P.C.

(57) ABSTRACT

The invention relates to a process for forming an optical element. A forming tool is used having a plurality of molding or hot-embossing portions formed on a surface thereof for molding or hot-embossing optical structures onto a substrate. On the surface of the substrate there is formed at least one preformed portion. The substrate is heated to a temperature above a transition temperature and the forming tool and the substrate are pressed against each other for forming an optical element having a plurality of structures having an optical effect, wherein the shape of the structures having an optical effect is given by the respective associated molding or hot-embossing portion.

According to the invention, when the forming tool and the substrate are pressed against each other, the respective preformed portion of the substrate first of all gets into contact to the associated molding or hot-embossing portion or to the forming tool at a central area so that a nip, which is formed between a surface of the respective preformed portion and a surface of the associated molding or hot-embossing portion or of said forming tool extends and broadens from said central area towards an edge of the respective preformed portion or of said substrate. According to the invention the substrate and said forming tool are provided with a substantially identical base so that the deformation ratio of the substrate is advantageously low.

22 Claims, 8 Drawing Sheets

METHOD FOR FORMING AN OPTICAL ELEMENT

FIELD OF INVENTION

The present invention relates in general to the production of optical elements by hot-forming of optical substrate, in particular by pressing or hot-embossing or molding an optical substrate. In particular, the present invention relates to a method for forming an optical element by a hot-forming process as well as to a substrate and a forming tool for such a method.

BACKGROUND OF INVENTION

Diffractive optical elements (DOEs), lens arrays and refractive microoptical elements are becoming more and more important as elements of modern optics. Many electronic devices for consumer market applications nowadays often include also optical elements that are decisive for a key function of the electronic devices. As an example, mobile telephones with integrated digital cameras are becoming more and more popular nowadays. Also in optical recording apparatus optical elements for precise imaging and forming of light rays during reading and/or writing are necessary. In particular for applications for the consumer market the development of low cost production methods of optical elements having an adequate precision are very important.

In general, in hot-forming of optical surfaces one can distinguish between 'pressing' processes and 'hot-embossing' or 'molding' processes. When 'pressed', the shape of the surface of a substrate or of a semi-finished product for the optical element that is to be produced is changed in its entirety. As an example, a spherical or planar surface can be deformed into a particular aspherical surface. When 'hot-embossed' or 'molded', however, the profile of the surface of the substrate or semi-finished product is varied locally for the optical element. Thus, when producing diffractive optical elements or microoptic elements, i.e. structures of relatively small dimensions, the surface, which is in most cases planar or curved locally by a small amount only as compared to the microstructures to be produced, is preserved while local impressions or protrusions are hot-embossed or molded onto the surface. In comparison to pressing the deformation ratio for hot-embossing or molding is substantially lower.

Hot-forming of optical elements offers particular economic advantages, if finishing of the structures having an optical effect, i.e. of the diffractive or refractive structures, on the surface of the deformed optical element is not necessary any more. As is commonly known, this requires a high precision of the forming tools used for hot-forming. Diffractive optics, e.g. microlenses, require a surface quality of the order of a quarter of the wavelength of optical light. Diffractive microoptics should be produced even more precisely. One problem when producing optical elements by hot-forming is the inclusion of process gases in the surface of the optical element during the hot-forming process, as this results in disturbing crater-shaped impressions on the surface of the optical elements. From the prior art various measures are known for avoiding inclusion of process gases on the surface of optical elements during a hot-forming process.

According to a first approach hot-forming is performed in a vacuum chamber. As an example a high precision glass forming pressing apparatus is commercially available from Toshiba Machine Co., America, type GMP-211V, capable of exerting a maximum pressing force of 19.6 kN for a maximum outer diameter of the die of up to 110 mm under vacuum conditions of better than $6 \times 10^{-1}$ Pa. This approach is, however, time-consuming and demanding for vacuum pumps.

According to another approach, which is disclosed in Japanese laid-open patent application no. 2002-293 553 A, a glass preform is produced by a pre-molding step with structures already formed on the surface of the glass preform that are deformed during a subsequent primary molding step into the desired structures. Due to the smaller deformation ratio the total volume of the process gas included between the die and the glass preform is smaller. However, the inclusion of process gas cannot be prevented reliably. Furthermore, an additional molding tool and an additional process step are required, which is less efficient.

EP 648 712 A2 discloses a process for press-molding of optical elements, wherein a blank is put into a press-molding form and a force utilized for pressing is increased and decreased periodically. While the pressure is increased that surface of the blank, which is in contact to the surface of the die, is deformed until a bubble of process gas is formed in a volume that is surrounded by the deformed surface area. When the pressure is reduced, the process gas, which is included in the volume and is under a certain overpressure, can escape laterally along the surface of the die. Due to the intermediate reduction of the pressure the total pressing time is longer. Furthermore, gas inclusions can hardly be predicted and modeled, so that it is very difficult to specify the precision of the optical elements to be produced in advance. Even if the pressure is increased and decreased various times periodically, residual inclusions of process gas persist, which is detrimental to the surface quality of the optical element.

U.S. Pat. No. 6,305,194 B1 discloses a process and apparatus for press-molding an array of optical elements. A relatively small ball of an optical material is put onto a shell-shaped central nest of a die. When the two dies are pressed against each other, the ball is more and more flattened. In this process the material flows radially outward and drives residual process gas out of the volume of the die. The material of the optical element is strongly deformed in this process, which results in relatively long processing times and high production costs. If relative tiny structures are formed on the surface of the die, e.g. for forming microlenses or diffractive structures, the flow of the material into the structures, e.g. into impressions, cannot be controlled during the process. Therefore one cannot prevent the inclusion of residual process gas into the surface of the optical element during the hot-forming process.

U.S. Pat. No. 6,305,194 B1 also discloses a method, wherein an upper half of a forming tool comprises a molding or hot-embossing portion, which is curved convexly, and wherein a lower half of forming tool comprises a molding or hot-embossing portion, which is curved concavely. A plano-convex preform is put in between the two halves of the forming tool, said preform being deformed to a concave-convex lens. The radius of curvature of the convexly curved molding or hot-embossing portion is smaller than the radius of curvature of the concavely curved molding or hot-embossing portion so that the respective molding or hot-embossing portion comes into contact with the preform near a central area, when the two halves of the forming tools are pressed against each other, which causes that no gas is trapped in the respective molding or hot-embossing portion, when the molten or softened material of the preform flows radially outward.

U.S. Pat. No. 6,305,194 B1 also discloses a process, in which an upper half of a forming tool comprises a convexly curved molding or hot-embossing portion and in which a lower half of a forming tool comprises a concavely curved molding or hot-embossing portion. A plano-convex preform is put in between the two halves of the forming tools, which preform is deformed to a concave-convex lens. The radius of curvature of the convexly curved molding or hot-embossing portion is smaller than the radius of curvature of the concavely curved molding or hot-embossing portion so that the respective molding or hot-embossing portion comes into contact with the preform at first near a central portion, when the two halves of the forming tools are pressed against each other, which causes that no gas remains trapped in the respective molding or hot-embossing portion, when the molten or softened material of the preform flows radially outward.

The deformation of the preform in this process is, however, relatively high. This results in a relatively long total processing time, which is not economical. Furthermore, the relatively high deformation ratio of the preform requires relatively high process temperatures, which causes stress within the optical element after deformation. Such stress or tension can be the reason for an undesired birefringence of the optical element. It can occur that the softened or molten material of the preform adheres to the respective molding or hot-embossing portion at the relatively high process temperatures required, which is detrimental to the optical quality of the optical element.

SUMMARY OF INVENTION

It is an object of the present invention to provide a process and apparatus for forming an optical element by hot-forming, wherein inclusion of gas during the hot-forming process can be avoided more efficiently and wherein the optical element can be produced more precisely and cost efficient. According to another aspect of the present invention a substrate or glass preform for an optical element and a forming tool for forming the optical element using the process or apparatus according to the present invention is to be provided. According to another aspect of the present invention there is to be provided an optical element, produced with the novel method according to the present invention, and an optical imaging optics or optical engine having at least one such optical element.

A process according to the present invention comprises the steps of: providing a forming tool, at least one molding or hot-embossing portion being formed on the surface thereof for molding or hot-embossing a structure having an optical effect onto a substrate; providing the substrate, wherein on a surface of the substrate, which faces the forming tool, a preformed portion, which is respectively associated to said molding or hot-embossing portion, is formed; heating the substrate to a temperature above a transition or softening temperature of a material of said substrate; and pressing the forming tool and the substrate against each other to that the respective preformed portion is deformed in contact to a surface of the associated molding or hot-embossing portion, for forming an optical element having at least one structure having an optical effect, the shape of said structure being determined by the shape of the associated molding or hot-embossing portion.

According to a first aspect the process according to the present invention is characterized in that the forming tool and the substrate are provided such that a central area of the respective molding or hot-embossing portion comes into contact to a central area of the associated preformed portion, wherein the respective preformed portion and the molding or hot-embossing portion are formed such that a nip, which is formed between a surface of the respective preformed portion and a surface of the associated molding or hot-embossing portion, broadens from the central portion towards an edge of the respective preformed portion.

When during the hot-forming process, the forming tool and the substrate are pressed against each other and get closer to each other due to deformation of the substrate to the optical element, the material of the surface of the substrate within the respective preformed portion is deformed more and more in contact to the surface of the associated molding or hot-embossing portion of the forming tool. Starting with the smoothly shaped central area of the preformed portion, which is in contact to the correspondingly and smoothly formed central area of the associated molding or hot-embossing portion already at the beginning of the hot-forming process (with no process gas being included in the correspondingly shaped central area of the associated molding or hot-embossing portion), at first portions within the preformed portion adjacent to the central area come into contact to the surface of the associated molding or hot-embossing portion. During the following hot-forming process the phase interface between substrate, forming tool and gas moves from the central area of the preformed portion more and more towards the edge of the respective preformed portion. Any process gas existing in the nip is more and more displaced out of the preformed portion, until finally the substrate is in full contact to the surface of the associated molding or hot-embossing portion within the preformed portion. Thus, according to the present invention no process gas is included between the substrate and the forming tool.

As the process gas is displaced or expelled smoothly and continuously out of the molding or hot-embossing portion during the hot-forming process, it is not necessary according to the present invention to use a vacuum during the hot-forming process. Thus, a process step can be saved and the apparatus can be provided at less total costs. According to the present invention the pressure for pressing the forming tool and the substrate against each other needs to be applied only once during the predetermined time period and the pressure can be maintained during the whole process step, preferably constant. The periodic increase or reduction of the process pressure is not necessary.

According to the present invention the deformation ratio of the substrate during the hot-forming process is low. More specifically, the base of the substrate or in case that a plurality of optical elements are to be formed on a single substrate simultaneously, e.g. for producing an array of microlenses or a plurality of optical elements to be separated, the base of the respective preformed portion is substantially identical with the base of the associated molding or hot-embossing portion or in case of the simultaneous forming of a plurality of optical elements, with the base of the respectively associated molding or hot-embossing portion. Thus, according to the present invention hot-forming can be performed quickly. A finishing, e.g. of edges of the optical element, can be avoided according to the invention. Due to the relatively small deformation ratio according to the present invention, the preformed portion of the substrate is deformed only by a small distance, which is substantially smaller as compared to the total thickness of the substrate, or, in other words, according to the present invention the substrate is only distorted by a small distance substantially smaller as compared to the total thickness of the substrate.

Preferably the profile of the preformed portion mates to the profile of the associated molding or hot-embossing portion so that the nip, which exists between the surface of the preformed portion and the surface of the associated molding or hot-embossing portion, continuously broadens towards the edge of the respective preformed portion during the entire hot-forming process. Thus it is ensured that even at the end of the hot-forming process, when almost the entire surface of the molding or hot-embossing portion is fully in contact to the substrate, the process gas can still escape towards the edge of the respective preformed portion. An appropriate contour of the preformed portion can be calculated simply by simulating the flow performance of the material of the substrate during the hot-forming process.

A method according to another aspect of the present invention, which also can be claimed independently and which can be used particularly for forming of convexly or concavely curved structures having an optical effect on the surface of the optical element, is characterized in that the forming tool and the substrate are provided such that a central area of the respective molding or hot-embossing portion is in contact to a central area of the associated preformed portion, wherein the respective preformed portion and the respective molding or hot-embossing portion are formed such, the following relation is held: $r1 < r2$, wherein $r1$ is the radius of curvature of the respective molding or hot-embossing portion, which is positive if the center of curvature of the surface of the respective molding or hot-embossing portion lies within in that half-space, in which the forming tool is disposed, and which is negative if the center of curvature of the surface of the respective molding or hot-embossing portion lies within the other (opposite) half-space, and wherein $r2$ is the radius of curvature of the associated preformed portion, which is negative if a center of curvature of the surface of the respective preformed portion lies within that half-space, in which the substrate is disposed, and which is positive if the center of curvature of the surface of the respective preformed portion lies within the other half-space so that a nip is formed between the surface of the respective preformed portion and the surface of the associated molding or hot-embossing portion.

Preferably the profile of the molding or hot-embossing portion of the forming tool and the profile of the respectively associated preformed portion of the substrate are mated such that the nip continuously broadens from the central area towards the edge of the respective preformed portion or molding or hot-embossing portion. Such a nip results in a continuous and smooth flow behavior of the material of the substrate within the molding or hot-embossing portion during the hot-forming process so that the material of the substrate can gradually flow, starting from the central area, outwards as to finally fill out the entire molding or hot-embossing portion. When the material of the substrate flows outwards, any residual process gas existing in the nip is expelled outwards and fully displaced out of the molding or hot-embossing portion.

Preferably no obstacles exist on the path from the central area towards the edge of the respective preformed portion or molding or hot-embossing portion, which might impede expelling the process gas so that the process gas can be displaced or expelled unhindered out of the nip towards the edge.

For further supporting expelling the process gas out of the nip between the forming tool and the substrate, a longitudinal depression, e.g. a channel or groove, can be formed on a surface of the forming tool and/or of the substrate outside the respective molding or hot-embossing portion, which connects to the edge of the forming tool or substrate. Thus, the respective depression is disposed in areas, where no structures having an optical effect are to be formed. Thus, the optical function of these optical structures, i.e. of the diffractive or refractive structures, is not affected.

The respective longitudinal depression can also communicate with at least one nip between the surface of the preformed portion and the surface of the associated molding or hot-embossing portion, for letting off the process gas during the hot-forming process even more efficiently.

According to a first embodiment of the present invention the nip between the surface of the preformed portion and the surface of the associated molding or hot-embossing portion can broaden in only one direction parallel to a surface of the forming tool. E.g. if line-shaped protruding portions for producing an optical diffraction grating are to be formed, e.g. line-shaped structures with a saw-tooth-shaped profile in case of a blazed diffraction grating, the surface of the substrate can be bent away from the surface of the forming tool to a minor extent and in a convex manner and in a direction in parallel to the longitudinal direction of the line-shaped structures of the forming tool. Thus, during the hot-forming process at first the central area of the convexly curved substrate comes into contact to the surface of the forming tool. During the hot-forming process the optical substrate is pressed flat to a planar substrate, on the surface of which the line-shaped structures are molded or hot-embossed as to be shaped in correspondence to the structures, which are formed on the surface of the forming tool.

According to another embodiment of the present invention, the nip between the surface of the preformed portion and the surface of the associated molding or hot-embossing portion can broaden in two directions orthogonal to each other and in parallel to a surface of the forming tool.

According to another embodiment of the present invention, which is of particular use for forming convexly or concavely curved structures having an optical effect, the nip between the surface of the preformed portion and the surface of the associated molding or hot-embossing portion is formed as an annular nip that broadens, starting from the central area, radially outwards.

According to the present invention said at least one molding or hot-embossing portion, which is provided on the surface of the forming tool, is formed as a raised (protruding) portion or as an impression, having a profile that mates to the optical function to be performed by the optical structure, which is to be formed on the surface of the optical element. Examples for such profiles are convexly or concavely curved profiles, aspherical curved raised (protruding) or depressed portions, rectangular or polygonal structures, also structures having slanted portions. Such appropriately shaped molding or hot-embossing portions can be formed on the surface of the forming tool using appropriate process techniques, particularly by direct machining the surface of the forming tool, e.g. by laser ablation, ion beam or electron beam writing, ion beam etching or ion beam milling, reactive ion etching, chemically assisted ion beam etching, wet or dry etching.

According to the present invention the substrate is provided as a preform on a surface of which at least one preformed portion having the shape of a raised (protruding) portion or of a depression is formed, namely at a location, which corresponds to the location of the associated molding or hot-embossing portion of the forming tool in the pressing or molding apparatus. Such preforms can be provided using any appropriate manufacturing process, e.g. by machining the surface of a respective substrate. Preferably, however, the preform can also be formed using a hot-forming process according to the present invention, e.g. by pressing or molding or hot-embossing.

In order to obtain a high surface quality of the optical elements, it is important that the preform is already manufactured with an appropriately high surface quality. According to the present invention this surface quality, however, can be lower than that of the optical elements to be produced, as the preformed portions are further deformed during the hot-forming process. Thus, the surface quality of the structures having an optical effect is essentially given by the surface quality of the molding or hot-embossing portions of the forming tool and by the specifications of the material of the substrate as well as by process parameters during the hot-forming process.

Preferably the volume of the respective molding or hot-embossing portion corresponds to the volume of the associated preformed portion. Thus, it is ensured that any process gas is fully displaced out of the molding or hot-embossing portion of the forming tool and that the entire molding or hot-embossing portion of the forming tool is filled out by the material of the substrate during the hot-forming process. The surface of the optical element after the hot-forming process represents a negative form of the surface of the forming tool. More specifically the total volume of the molding or hot-forming portions can correspond to the volume of the associated preformed portions or to the total volume of the associated preformed portions heated to a temperature above the transition or softening temperature of the material of the substrate using appropriate process parameters, in particular the energy used for heating the substrate so that the associated preformed portion or portions can be deformed.

According to another aspect of the present invention the preform can also be configured such that after the hot-forming process, a small clearance remains between the surface of the substrate and the surface of the forming tool at an edge of the molding or hot-embossing portion. Such a clearance eases the subsequent lifting-off of the forming tool from the surface of the optical element and ensures even more reliably that all process gas is expelled out of the molding or hot-embossing portion of the forming tool during the hot-forming process. Such a method is particularly applied, if one attempts to form a plurality of optical elements on a single substrate using a hot-forming process such that areas between the optical structures shall have no optical effect. It is possible to cut or divide the substrate in these areas after the hot-forming process for separating the plurality of optical elements.

Of course, the surface of the forming tool may also be provided with a coating, which reduces the wettability of the forming tool with the material of the substrate during the hot-forming process. Appropriate coatings are well known from the prior art and particularly include thin metalizations, preferably of a noble metal or a noble metal alloy.

According to another aspect of the present invention the forming tool and the substrate are provided such that a form tolerance d between the forming tool and the substrate is given by:

$d > 10$ μm and $d < (200$ μm $+ D/10)$;

wherein D indicates a diameter of a molding or hot-embossing portion or of a structure on the forming tool in microns. As a result of such a small form tolerance, according to the present invention an advantageously low deformation ratio can be achieved.

The process according to the present invention is suited for hot-forming of various different diffractive and/or refractive optical elements, e.g. microlenses, arrays of microlenses, plano-convex lenses, plano-concave lenses, convex-convex lenses, concave-convex lenses, concave-concave lenses, aspherical lenses, anamorphic and diffractive optical structures, e.g. of diffraction gratings, also of blazed diffraction gratings, and Fresnel zone plates.

According to another aspect of the present invention arbitrary optical systems can be assembled out of a plurality of optical elements produced according to the present invention.

According to the present invention the optical elements or systems can be utilized in arbitrary optical applications, e.g. in digital optical projection, in analog or digital cameras, particularly cameras of mobile phones and camcorders, in microscopy as lenses or arrays of lenses, as homogenizers, as imaging optics, in applications in the automotive sector, e.g. for LED headlights, head up displays, for optical micro reflectors, for imaging of lasers, particularly of RGB lasers, for optics in the area of optical storage for optically reading and/or writing of data from and/or onto an optical storage medium, including blue-ray discs.

For the purpose of this application, optical elements, e.g. lenses, shall be distinguished with regard to the diameter of corresponding microoptical elements. More specifically, optical elements such as lenses shall have a diameter of at least 1 mm, whereas microoptical elements shall have a diameter of less than 1 mm.

The process according to the present invention is not only limited to producing of microoptical structures, but can be utilized for producing arbitrary refractive and/or diffractive structures using a hot-forming process.

The process according to the present invention can be applied to any optical material deformable by means of a hot-forming process, particularly preferable to any type of glass, in particular low Tg glasses, soda-lime glass, silicate glass, borate glass, borosilicate glass, phosphate glass, fluoride glass, fluorophosphate glass, halide glass, optical glass, or to any appropriate plastic material for optical applications, in particular to PMMI, COC, TOP, PMMA, polyurethane, TOPAS, PC (polycarbonate). The substrate can be formed integrally with any of the before-mentioned materials. According to another aspect of the present invention, the substrate may also be formed as a two- or multi-layer composite material having a cover layer having preformed portions formed therein that are deformed to optical elements or structures in the afore-mentioned manner. Suitably, the cover layer exhibits a softening temperature below the softening temperature of the layer of the composite material disposed underneath so that during deformation only the material of the cover layer, but not that of the layer disposed underneath, softens so that the composite material remains stable.

Further aspects of the present invention relate to a correspondingly formed substrate, a correspondingly formed forming tool, an apparatus for forming an optical element using the afore-mentioned process, to an optical element as well as to an optical imaging system comprising at least one such optical element.

BRIEF DESCRIPTION OF DRAWINGS

Hereinafter the present invention will be described with reference to preferred exemplary embodiments and to the accompanying drawings, from which further features, advantages and objects may be derived, and wherein.

DETAILED DESCRIPTION OF PREFERRED EMBODIMENTS

Throughout the figures identical reference numerals relate to identical or substantially equivalent elements or groups of elements.

Figure 1A:
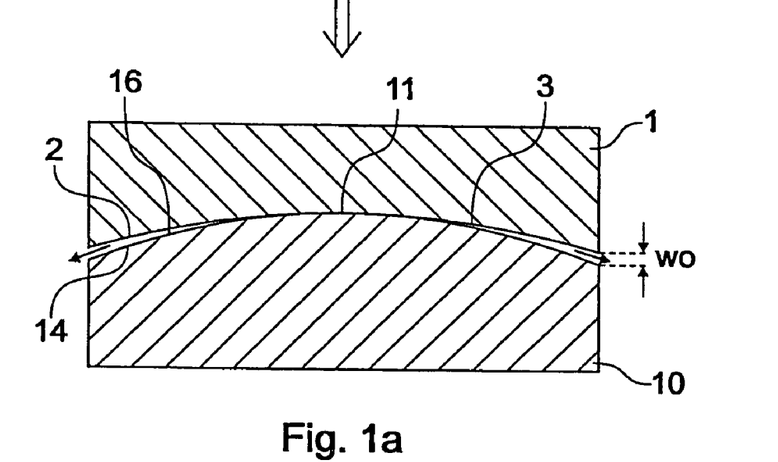
FIG. 1a-1c illustrate in a schematic cross-sectional view a process according to the present invention for molding or pressing a plano-convex lens.
Figure 1B:
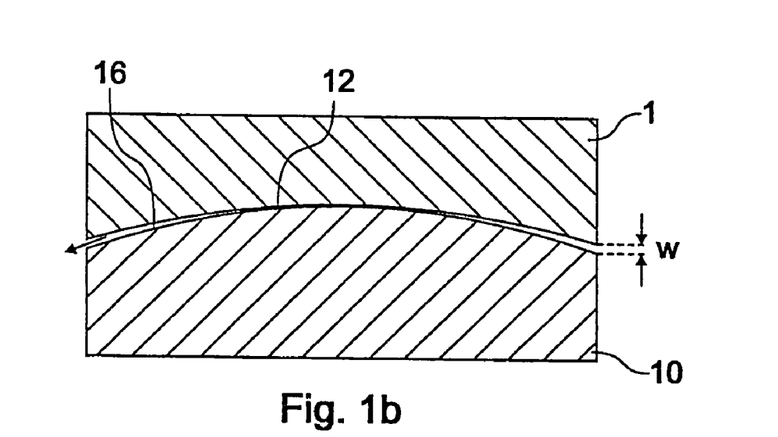
Figure 1C:
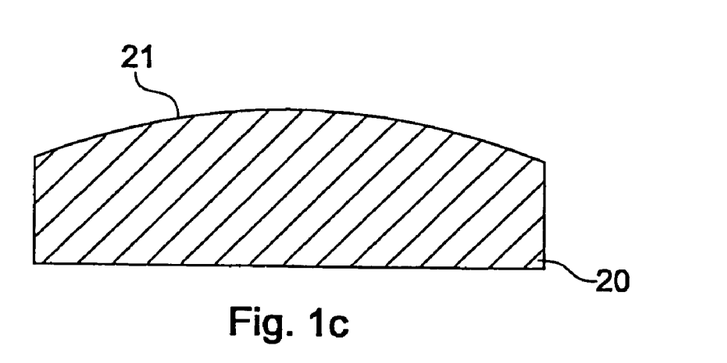

Referring to FIGS. 1a-1c, in the following a process for molding or hot-embossing or pressing a plano-convex lens is described. Referring to FIG. 1a, a die 1 and a substrate 10, e.g. a glass preform, are put into an apparatus, wherein the die 1 and the substrate 10 are pressed against each other by a force that is represented by the vertical arrow. As shown in FIG. 1a, the die 1 and the substrate 10 have planar rear sides that are aligned in parallel with each other during the hot-forming process. A concave impression 3 is formed in the surface of the die 1. A convexly curved protruding portion 16 is formed on the surface of the substrate 10. The radius of curvature of a concave impression 3 is larger than the radius of curvature of the convexly curved portion 16.

The concave impression 3 serves as a molding or hot-embossing portion. Using a hot-forming process, as described below, the profile of the concave impression 3 is to be molded or hot-embossed onto the surface of the substrate 10. The convexly curved portion 16 is preformed in the sense of the present application, e.g. using another hot-forming process. The substrate 10 can, of course, also be a blank that is ground or preformed, e.g. press-formed, appropriately. As shown in FIG. 1a the base of the convex bulging substantially corresponds to the base of the concave impression 3.

At the beginning of the hot-forming the die 1 and the substrate 10 get closer to each other such that the central areas 11 of the concave impression 3 and of the convexly curved portion 16 contact each other. In this condition there remains a clearance WO at the edge 3 of the concave impression 3 and at the edge 14 of the substrate 10, said clearance being small as compared to the lateral dimensions of the concave impression 3 and the curved portion 16, respectively.

For hot-forming the substrate 10 is heated to a temperature above a transition temperature of the material of the substrate 10 so that the surface of the substrate 10 can be deformed. Due to the pressure between the die 1 and the substrate 10 the convexly curved portion 16 is increasingly deformed, starting from the central area 11. In this process the material of the substrate is displaced from the central area 11 towards the outside, namely to the edge 14 of the substrate 10. The portion that is designated by reference numeral 12 in FIG. 1b and is drawn with thickened lines designates a deformed portion, wherein the material of the substrate 10 can still be deformed, i.e. wherein the material of the substrate 10 is heated to a temperature above the transition temperature thereof. During the hot-forming process the die 1 and the substrate 10 get closer to each other so that the clearance w at the edge of the die 1 or of the substrate 10 decreases. As indicated by the arrows, when the material of the substrate is displaced, process gas included in the annular nip between the concave impression 3 of the die 1 and the convexly curved portion 16 of the substrate 10 is gradually displaced or expelled outside. This hot-forming process is continued until the nip between the die 1 and the substrate 10 has disappeared. Then the entire surface of the substrate 1 contacts the surface of the concave impression 3 of the die 1. Thus, the profile of the substrate 1 exactly corresponds to the profile of the concave impression 3 of the die 1, which serves as a molding or hot-embossing portion. After lifting-off the die 1 from the deformed substrate 10, an optical element 20 having a convexly curved surface 21 is obtained, as shown in FIG. 1c. The shape of the convexly curved surface 21 exactly corresponds to the shape of the concave impression 3 of the die 1.

As the interface between substrate, die and process gas gradually moves from the central area 11 towards the edge 2 or 14 of the die 1 or of the die 10 during the hot-forming process, all process gas is expelled out of the annular nip between the die 1 and the substrate 10. Thus, on the convexly curved surface 21 of the optical element 20 no crater-like structures exist anymore, which, according to the prior art, result from gas inclusions during the hot-forming process.

Although not shown in FIG. 1a it will become apparent to a person skilled in the art that the substrate 10 additionally can also be curved convexly and perpendicular to the drawing plane of FIG. 1a prior to performing the hot-forming process so that the process gas can also be expelled in a direction perpendicular to the drawing plane of FIGS. 1a-1c during the hot-forming process. As will become apparent to a person skilled in the art, the fundamental principle of the present invention has been explained above with reference to FIGS. 1a-1c, according to which the process gas is gradually expelled towards the outside during the hot-forming process. After the hot-forming process the optical element 20 preferably forms a cylindrical lens that extends in a direction perpendicular to the drawing plane of FIG. 1c. Generally, the present invention is, however, not limited to forming cylindrical lenses, but the optical element 20 according to FIG. 1c can also form a plano-convex optical lens according to another preferred aspect of the present invention.

Figure 2A:
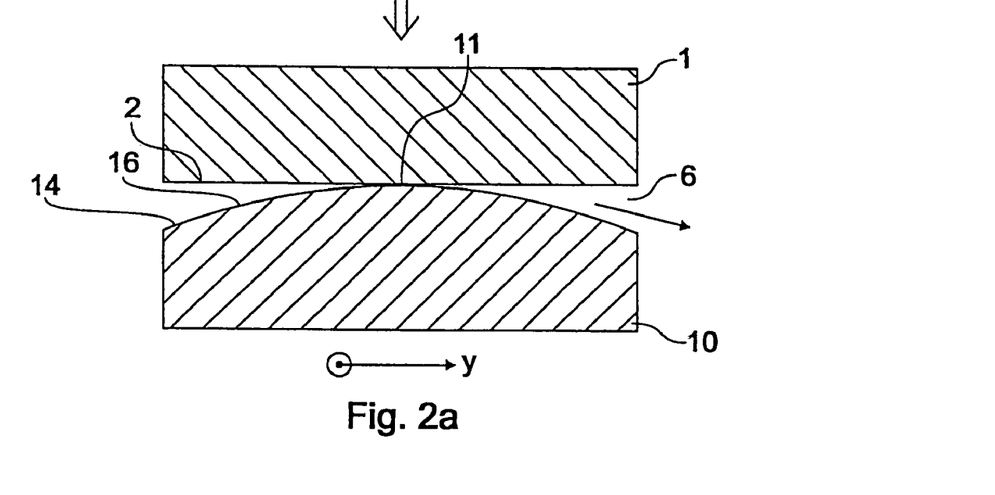
FIG. 2a-2c illustrate in a schematic cross-sectional view a process according to the present invention for molding or pressing an optical element having a planar surface with diffractive structures formed thereon.

Referring to FIGS. 2a-2c, in the following a process for forming a blazed diffraction grating on a planar substrate 10 will be described. For this purpose it is assumed that the substrate 10 spans a plane that is spanned by two coordinate axes x and y orthogonal to each other. As shown in FIG. 2a, the substrate 10, e.g. a glass substrate, is provided as a preform having a portion 16, which is convexly curved in the y direction. Thus during the entire hot-forming process a nip exists between the surface of the die 1 and the surface of the substrate 10, said nip continuously broadening towards the outside, wherein one surface of the nip is planar and defined by the surface of the die 1 and wherein the other surface of the nip is convexly curved and defined by the surface of the substrate 10. Thus, at the edge 14 of the substrate 10 a clearance WO exists, which is small as compared to the lateral dimensions of the substrate 10. As an example, the radius of curvature of the convexly curved portion 16 may be in the range between approximately 100 and 400 mm.

Figure 2B:
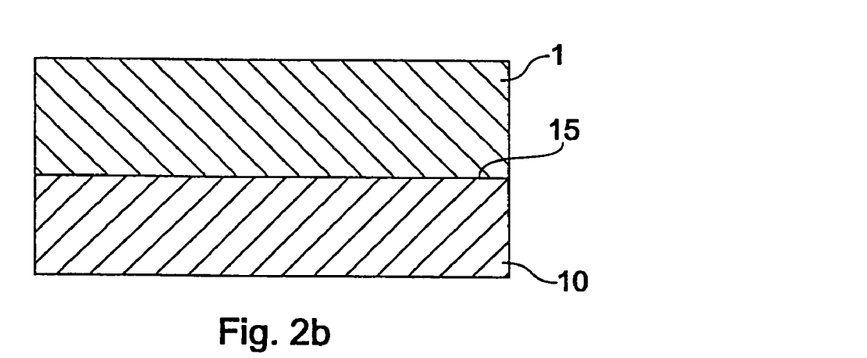

FIG. 2b shows the die 1 and the substrate 10 immediately before the end of the hot-forming process, when the entire surface of the substrate 10 is in contact to the surface of the die 1.

Figure 2C:
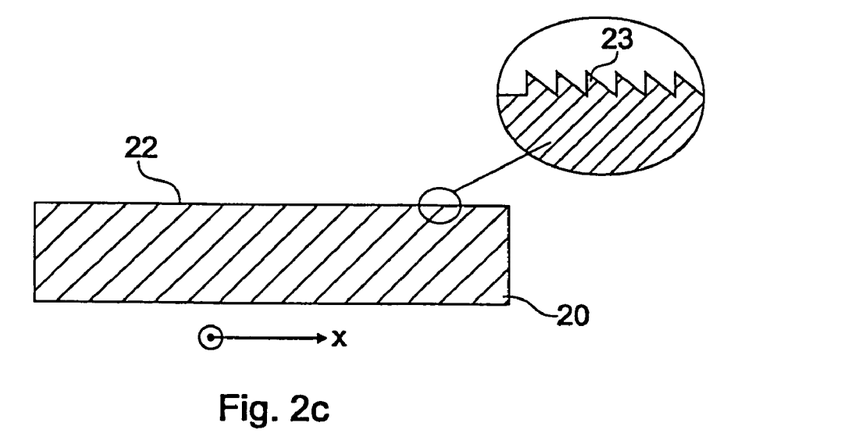

After lifting-off the die 1, one thus obtains an optical element 20 having a deformed planar surface 22, on which a plurality of equidistant line-shaped structures 23 having a saw-tooth-shaped profile is formed. According to FIG. 2c the line-shaped structures 23 extend in the y direction. During the hot-forming process also the surface 16 of the substrate 10, which in the beginning is convexly curved in the y direction is also deformed so that the nip 6, starting at the central area 11, gradually decreases and so that the process gas, which is included in the nip 6, is expelled by the material of the substrate in y direction towards the outside so that the whole process gas is gradually expelled out of the nip 6, as indicated by the arrow in FIG. 2a.

Figure 3A:
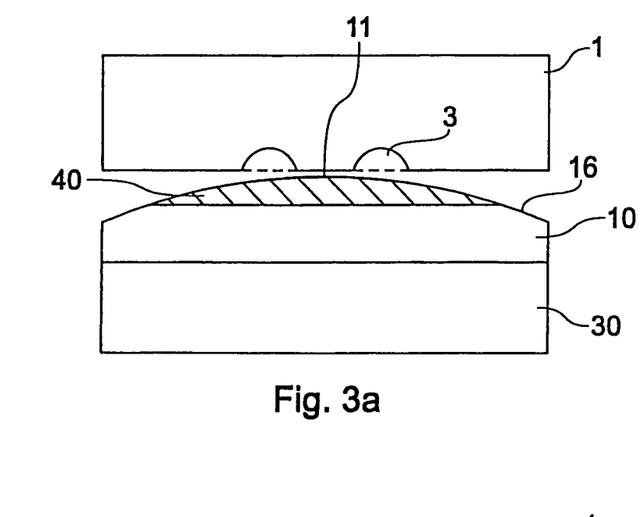
FIG. 3a-3d illustrate in a schematic cross-sectional view a preferred method according to the present invention for molding or pressing an array of convex microlenses onto a planar substrate.

Referring to FIGS. 3a-3d another preferred process according to the present invention for molding or pressing an array of convex microlenses onto a planar substrate will be described. As shown in FIG. 3a the substrate 10, which is held on a counter die 30, is curved convexly outwards, comparable to FIG. 1a. In the die 1 two concave impressions 3 are formed that are identical to each other or may be formed differently. When the die 1 and the substrate 10 get close to each other, at first the flat or planar area of the die 1 between the two concave impressions 3 will get into contact to the central area 11 of the convex bulging 16 of the substrate 10. As also shown in FIG. 3a the convex bulging 16 of the substrate is opposite to both of the concave impressions 3.

Figure 3B:
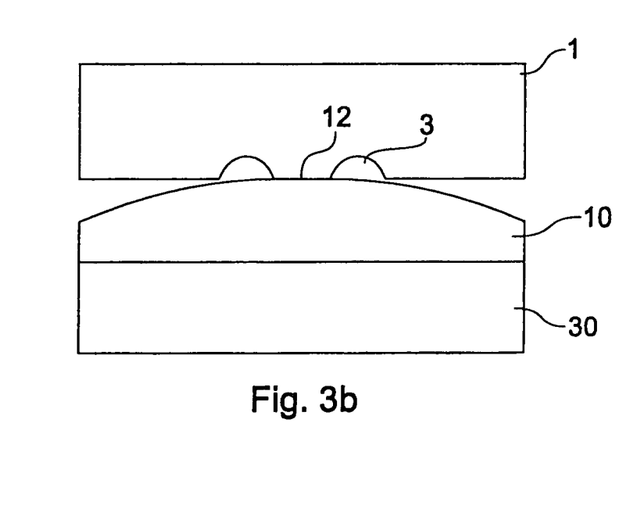
Figure 3C:
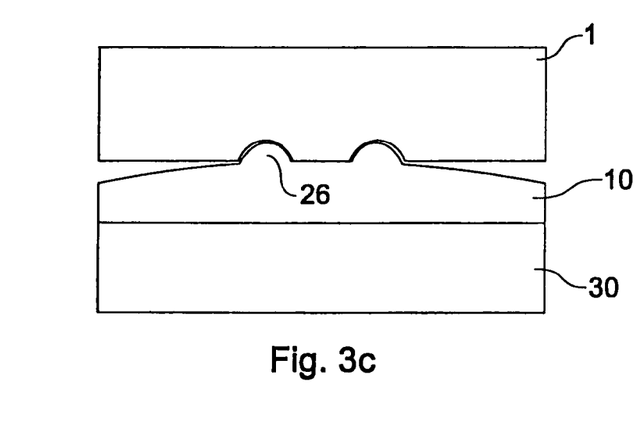

When the die 1 and substrate 10 are pressed against each other further, finally the central area will be deformed, as indicated in FIG. 3b by reference numeral 12. When die 1 and substrate 10 are pressed against each other further, the substrate material is gradually pressed into the concave impression 3 of the die 1. At the same time process gas, which exists in the concave impression 3, is gradually displaced towards the outside and out of the concave impression 3.

Figure 3D:
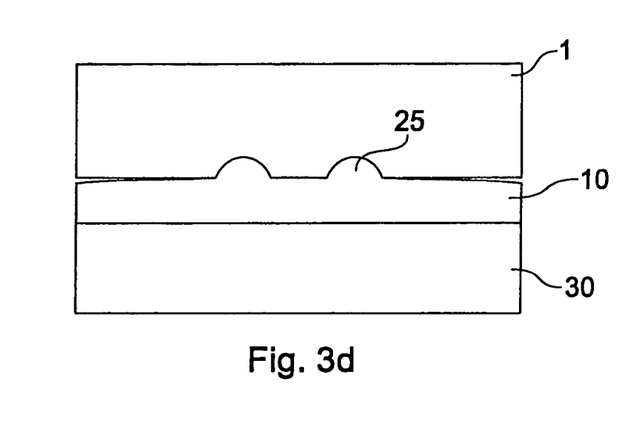

When the die 1 and substrate 10 are pressed against each other further, finally the concave impressions 3 are almost fully filled out by the substrate material, which is still deformable so that convex bulbs 26 are formed on the surface of the substrate 10. When the die 1 and the substrate 10 are pressed against each other further, finally the substrate material fills out the concave impressions of the die 1 completely. In this condition the substrate material fully contacts the inner surfaces of the concave impressions of the die 1 so that two convex microlenses 25 are formed on the substrate 10, as shown in FIG. 3d. After lifting-off, the two microlenses 25 can also be separated in a subsequent process step.

In FIG. 3a it is assumed that the dashed lines are indicate the volume V1 formed by the concave impressions 3. Further, it is assumed that the region 40, which is indicated by hatched lines, near the central area 11 of substrate 10 represents the substrate material of volume V2, which is to be deformed and displaced during the hot-forming process. Within the volume V2 the temperature of the substrate is above the softening temperature of the material of the substrate, which can be achieved easily by appropriate heating conditions. In order that process gas, which is included between the die 1 and substrate 10, is fully expelled before the deformed substrate fully contacts the die, according to the invention, assuming the case underlying the FIGS. 3a-3d, according to which two microlenses are to be formed on the substrate 10, the volume V2 is larger than or equal to a volume given by 2×V1. Generally speaking, the total volume, which in total is included by the preformed portions and which is at a temperature above the softening point of the substrate material, is larger than or equal to the volume included by the molding or hot-embossing portions.

Figure 4A:
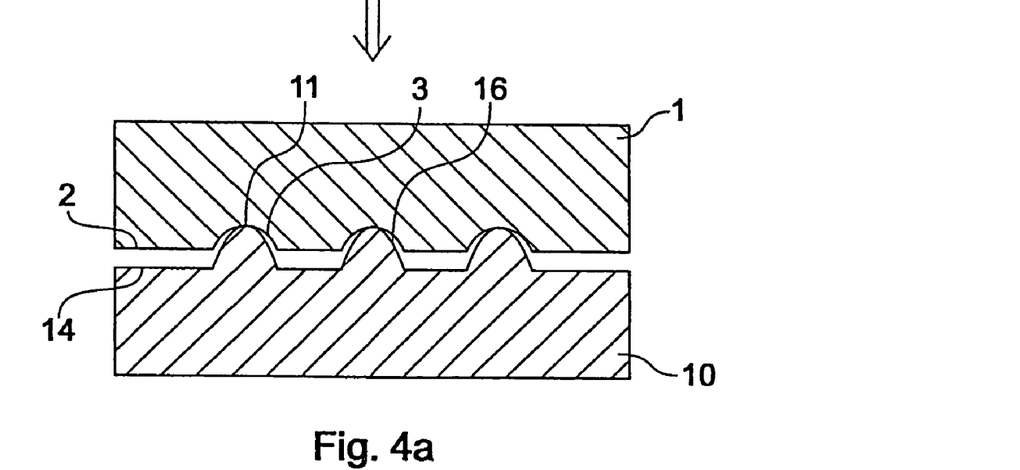
FIG. 4a-4c illustrate in a schematic cross-sectional view a modification of the process according to FIGS. 3a-3d for molding or pressing an array of convex microlenses onto a planar substrate.

Referring to FIGS. 4a-4c another modification of a process according to FIGS. 3a-3d for molding or pressing an array of convex microlenses onto a planar substrate will be described. As shown in FIG. 4a a plurality of concave impressions 3 is formed on the surface of the die 1, said concave impressions 3 functioning as molding or hot-embossing portions and defining the profile of the optical structures to be formed. Referring to FIG. 4a, a substrate 10, e.g. a glass preform, is provided on a surface of which a plurality of convexly curved protruding portions 16 are formed at locations, which correspond and are opposite to the locations of the concave impressions 3 of die 1. The radius of curvature of the convexly curved portions 16 is smaller than the radius of curvature of the concave impressions 3 of die 1. Thus, when the central areas 11 of the convexly curved portions 16 contact the central area 11 of the concave impressions 3 of die 1, a nip or clearance between the surface of the concave impression 3 and the surface of the convexly curved portion 16 remains, said nip continuously broadening in transverse direction. In the areas between the concave impressions 3 the surface of the die 1 and the surface of the substrate 10 is planar.

Figure 4B:
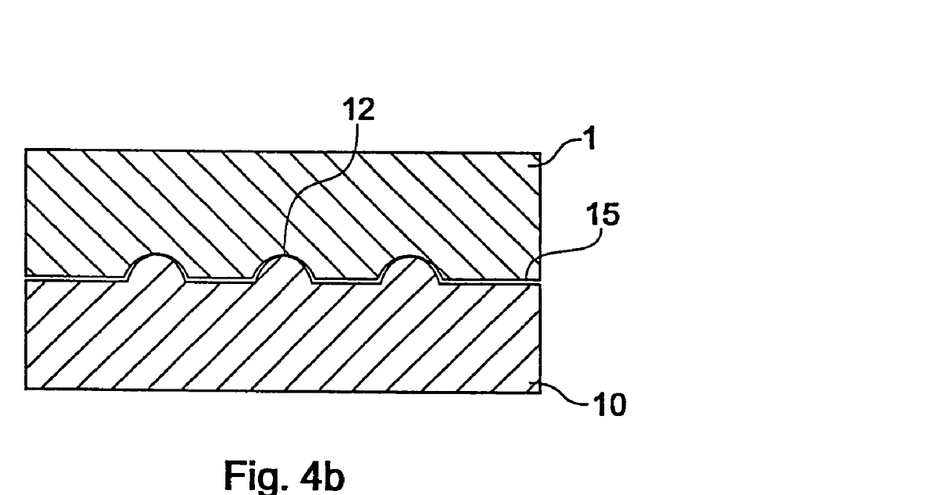

FIG. 4b shows the die 1 and the substrate 10 at the end of the hot-forming process, when practically the entire curved portion 16 has been deformed and when only a narrow nip between the surface of the die 1 and the surface of the substrate 10 remains at the edge of the respective concave impression 3 and in the area between the concave impressions 3.

Figure 4C:
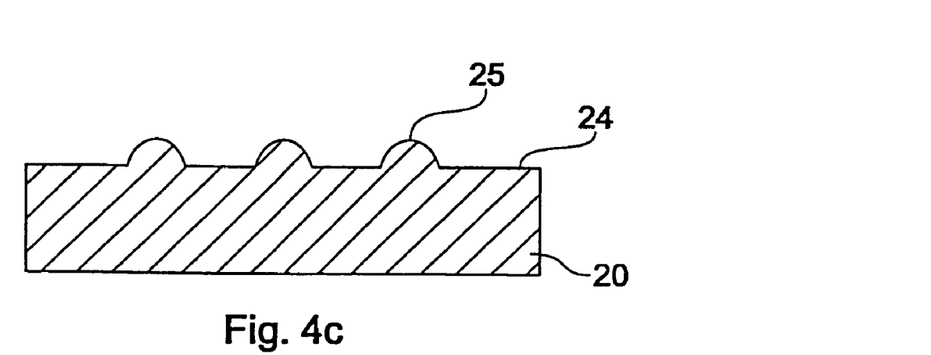

After lifting-off the die 1 an optical element 20 is obtained, having a plurality of convex microlenses 25 and of planar portions 24 formed on a surface thereof.

Figure 5:
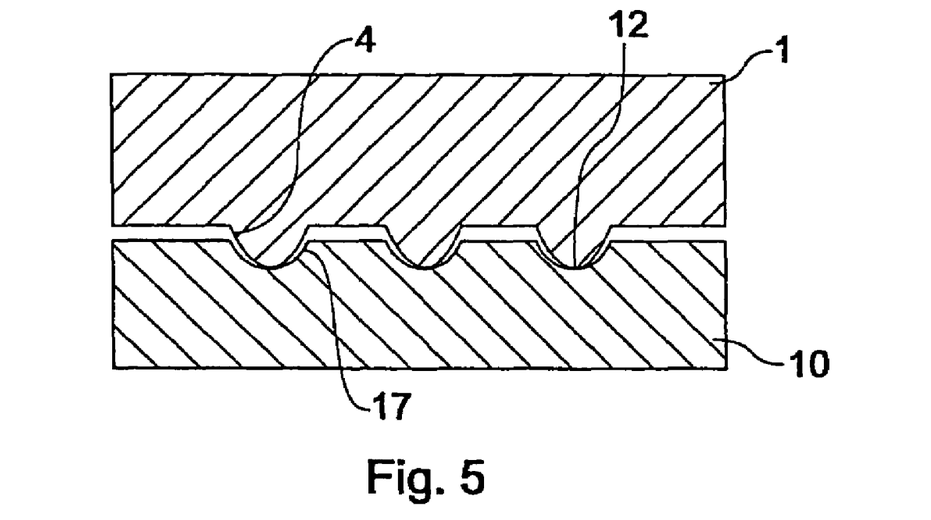
FIG. 5 illustrates in a schematic cross-sectional view another modification of the process according to FIGS. 3a-3d for molding or pressing an array of concave mirrors onto a planar substrate.

As shown in FIG. 5 the process according to the present invention can also be used for forming concave impressions 17 on a substrate 10. For this purpose, a plurality of convexly curved protruding portions 4 are formed on the surface of die 1. After hot-forming a reflection coating can be provided on the concave impressions 17 for forming a concave mirror.

Figure 6:
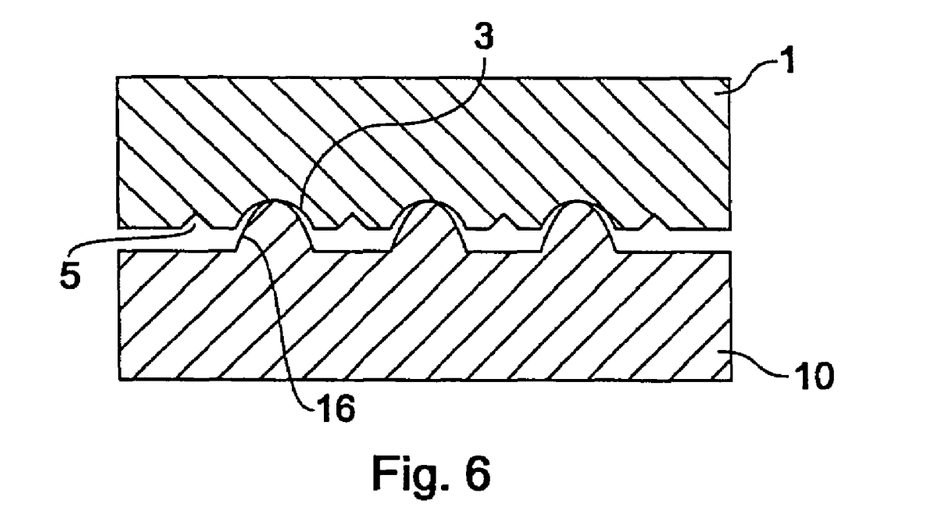
FIG. 6 illustrates in a schematic cross-sectional view another modification of the process according to FIGS. 3a-3d for embossing or pressing an array of convex microlenses onto a planar substrate.

As shown in FIG. 6, in the die 1 according to FIG. 4a additional longitudinal channels may be provided, e.g. wedge-shaped grooves 5, which can communicate with the edge portion of a respective concave impression 3 in die 1 for lacking-off residual process gas out of the concave impression 3, which functions as a molding or hot-embossing portion.

As will become apparent to a person skilled in the art, a substrate according to any of FIG. 4a, 5 or 6, having convex protrusions or concave impressions, can be provided by appropriate grinding of a substrate. Or the substrate according to FIG. 4a, 5 or 6 can be provided appropriately by an additional process step by hot-forming, e.g. molding of a substrate. Because such an additional process step usually gives rise to additional costs, generally according to the present invention the hot-forming is performed in a single process step for simultaneously producing a plurality of structures having an optical effect as shown in FIGS. 3a-3d.

As will become apparent to a person skilled in the art, by using the process according to the present invention also optical elements having at least one aspherically curved surface or a surface formed as a free-form surface can be formed. In such a process the respective preformed portion of the substrate may be spherically curved prior to deformation to the aspherically curved surface or to the surface formed as a free-form surface. Free-form surfaces in the sense of the present application are surfaces extending in a x-y plane that can be described using the following relationship:

$$f(x, y) := \frac{\sum_{m=0}^{N} \sum_{n=0}^{N} C_{\frac{(m+n)^2+m+3 \cdot n}{2}} \cdot x^m \cdot y^n}{L}$$

wherein L=constant and N=10.

Figure 7:
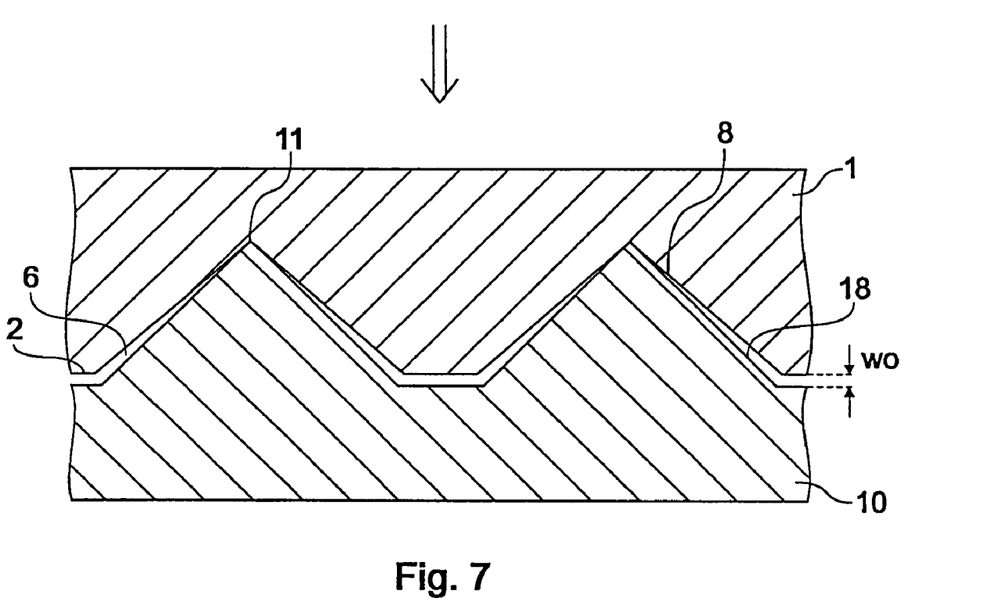
FIG. 7 illustrates in a schematic partial view a forming tool and an optical substrate for forming prism-shaped protruding optical structures on a surface of the substrate.

As shown in FIG. 7 the process according to the present invention is also suited for hot-forming of optical structures that are not curved. As shown in FIG. 7 a plurality of slanted portions 8 are formed in the surface of the die 1 for forming wedge-shaped channels in the surface of the die 1. At corresponding locations on the surface of substrate 10, e.g. of a glass preform, slanted portions 18 are formed for forming wedge-shaped protruding portions on the surface of the substrate 10. According to FIG. 7, the angle of inclination of the slanted portion 18 is greater than the angle of inclination of the slanted portion 8 so that the nip 6 between the surface of die 1 and the surface of substrate 10 broaden continuously from the central area 11, where the vertices of the wedge-shaped impressions or protruding portions contact each other. During the hot-forming process the nip 6 gradually narrows until finally the surfaces of die 1 and substrate 10 fully contact each other.

Although not shown in FIGS. 4a-7, the substrate may also be curved convexly in a direction perpendicular to the drawing plane of FIGS. 4a-7 prior to performing a hot-forming process.

Of course, the substrate 10 according to FIG. 7 may also be curved convexly to a small extent in a direction perpendicular to the drawing plane, e.g. as shown in FIG. 2a, so that process gas included in the nip is expelled more efficiently during the hot-forming process.

Figure 8:
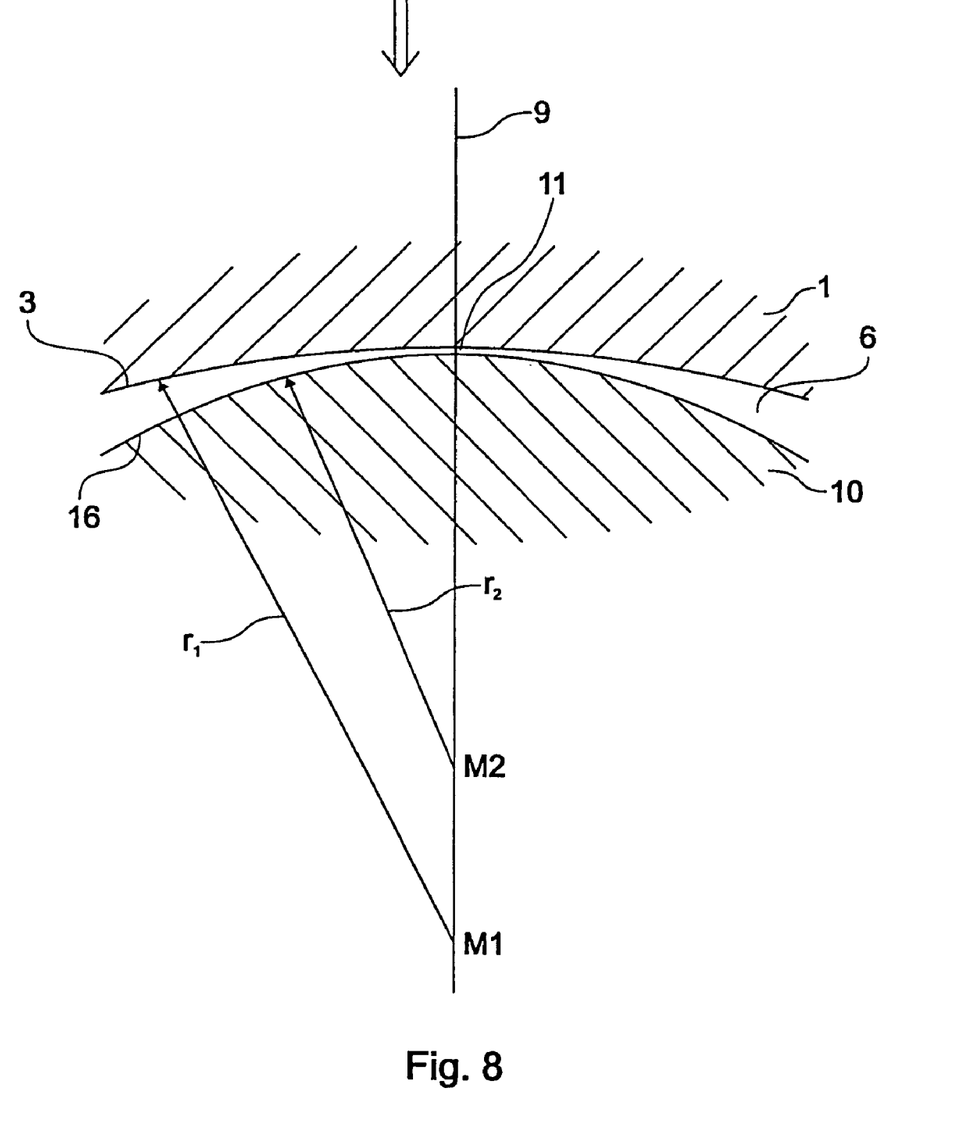
FIG. 8 explains in a schematic representation a sign convention for characterizing the radii of curvature of a preformed portion of a substrate and of a molding or hot-embossing portion of a forming tool, which can be used for characterizing the present invention.

Referring to FIG. 8, in the following a sign convention for characterizing convexly or concavely curved molding portions or preformed portions of a die according to the present invention and of a substrate according to the present invention, respectively, will be explained. Referring to FIG. 8, it is assumed that the central axis 9 is perpendicular to a tangent line to the convexly curved surface of substrate 10 and extends via the central area 11, where the convexly curved portion of substrate 10 and the concave impression of die 1 contact each other immediately before the hot-forming process. In this configuration the radii of curvature M1 of the concave impression 3 of die 1 and M2 of the convex bulging 16 of substrate 10, respectively, will lie on the center axis 9. In FIG. 8 the arrow r1 indicates the radius of curvature of the concave impression 3 in the surface of die 1, whereas arrow r2 indicates the radius of curvature of the convex bulging 16 on the surface of substrate 10. For the characterization it is assumed that the radii of curvature r1, r2 are signed real numbers. The sign convention used for characterizing the surfaces is similar to that used in optics for characterizing the refractivity of spherically curved interfaces in the approximation of paraxial optics.

According to FIG. 8 the surface of the concave impression 3 divides the drawing plane into an upper half-space, in which the die 1 is disposed, and into a lower half-space, wherein the die 1 is not disposed. Also the convexly curved surface 16 divides the drawing plane of FIG. 8 into an upper half-space, wherein the substrate 10 is not disposed, and into a lower half-space, wherein the substrate 10 is disposed. For characterization of the surfaces of the molding portion 3 and of the preformed portion 16 it is assumed that the radius of curvature r1 of molding portion 3 of die 1 is positive, if the center of curvature of the surface of the molding portion lies within that half-space, in which die 1 is disposed, and that the radius of curvature r1 is negative, if the center of curvature of the surface of molding portion 3 lies within the other half-space. Further, it is assumed that the radius of curvature r2 of the associated preformed portion 16 of substrate 10 is negative if the center of curvature of the surface of the preformed portion 16 lies within that half-space, in which the substrate 10 is disposed, and that the radius of curvature r2 is positive, if the center of curvature of the surface of the preformed portion 16 lies within the other half-space.

Using this sign convention, in the example given in FIG. 8 the radius of curvature r1 is negative, which also holds for the radius of curvature r2. As can be derived from FIG. 8 the absolute value of r1 is larger than the absolute value of r2. Thus the following relationship holds: r1<r2<0.

In the corresponding case that a concavely curved surface is to be molded or hot-embossed, the molding portion of die 1 should be curved convexly, which results in a corresponding positive radius of curvature r1. Further, the associated preformed portion of the surface of substrate should be curved concavely so that the corresponding radius of curvature r2 should also be positive. Thus, the absolute value of r2 should be larger than the absolute value of r2, i.e.: 0<r1<r2.

Using this convention the radius of curvature of a planar surface would be infinite. For example, if a concavely curved lens surface is to be produced from a planar glass preform, the molding portion of die 1 would be convexly curved, i.e. the corresponding radius of curvature r1 would be positive, and the radius of curvature of the planar glass preform would be infinite. Thus the following relationship would hold: r1<r2.

Of course, the sign convention explained above is subject to the secondary condition that the central area of the molding portion must contact the central area of the preformed portion immediately before conducting the hot-forming process. Thus, this excludes the formation of a lens, which is convexly curved in all directions of a plane, from a planar glass preform.

Embodiment 1

For pressing a planar array of cylindrical lenses (diameter 30 mm) with aspherical cylinder lenses, a glass preform having the same diameter, a planar surface and a convex surface with a radius of curvature of 300 mm is pressed. The convex surface faces the die with the array of cylinder lenses.

The heights of the cylinder lenses is 0.3 mm. Due to the curvature of the glass preform an additional pressing distance of proximately 0.4 mm has to be passed. The hot-forming is performed under a nitrogen atmosphere for preventing corrosion of the forming tools.

It has been observed that the aspherical surfaces of the cylinder lenses could be formed without any roughness due to inclusion of nitrogen.

Embodiment 2

For pressing an aspherical imaging lens a glass preform having the diameter (70 mm), a planar surface and a convex surface with a radius of curvature of 45 mm is pressed.

The convex side faces the die with the array of cylinder lenses. Due to the curvature of the glass preform an additional pressing distance of approximately 0.3 mm has to be passed. It has been observed that aspherical surfaces could be formed without any roughness due to inclusion of nitrogen. Generally, the height of the structures is given by:

$$z(r) = \frac{cr^2}{1 + \sqrt{1-(1+k)c^2r^2}} + \alpha_1 r^2 + \alpha_2 r^4 + \ldots \alpha_n r^{2n}$$

wherein:

Z: height of lens,

C: curvature,

K: conical parameter.

In the embodiment the parameters were chosen as follows:

c=1/36.409;

k=−1;

a2=1.08E-06 a4=2.16E-10 a6=−5.19E-15 wherein B270 was used as glass.

Embodiment 3

For molding diffractive optical elements (DOE) on an aspherical imaging lens, an aspherical lens (designed according to embodiment 2) was used. The planar surface was coated with plastic material and subsequently structured by a DOE form using a molding process as described above. The planar surface faced the die with the DOE. Due to the curvature of the glass preform, an additional molding distance of approximately 0.05 mm had to be passed. It has been observed that DOEs without any roughness due to inclusion of nitrogen could be produced. The phase function of the DOEs is given by:

$\phi(r) = -6.75 r^2 + 0.001045 r^4$ wherein f[rad] and r: 0-35 mm.

Figure 9:
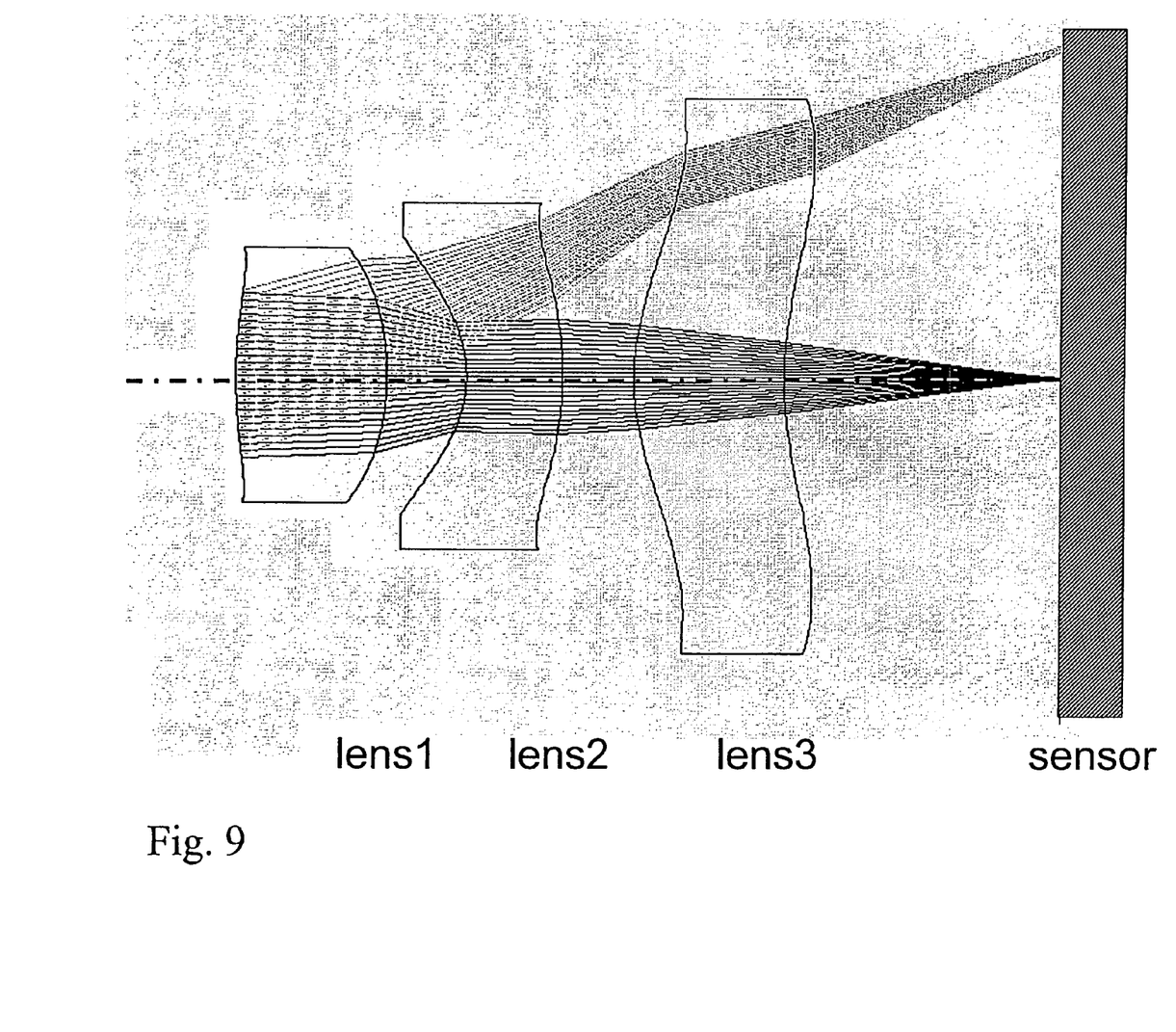
FIG. 9 shows an optical imaging system comprising at least one optical element produced according to the present invention.

Referring to FIG. 9 in the following an exemplary imaging optics comprising at least one optical element produced according to the present invention will be described. Referring to FIG. 9, the imaging optics comprises three optical lenses disposed one behind the other, wherein the first lens is a convex-convex lens having a radius of curvature of 3.89 mm and −2.40 mm, respectively, wherein the second lens is a concave-convex lens having a radius of curvature of −1.05 mm and −3.20 mm, respectively, and wherein the third lens is a convex-concave lens having a radius of curvature of 1.96 mm and 3.08 mm, respectively. More specifically, the surfaces of the optical lenses were formed as free-form surfaces according to the relationship given above. The respective glass preform had spherically curved surfaces before being deformed.

As will become apparent to a person skilled in the art when studying the above description, another aspect of the present invention relates to an optical engine having at least one imaging optics or imaging optics system as described above for imaging light, particularly light rays. Some examples, which shall not be construed as to limit the scope of the present invention are as follows: digital optical projection, analog or digital cameras, particularly cameras of mobile phones and camcorders, devices of microscopy, imaging devices having lenses or lens arrays, homogenizers for homogenizing light beams including laser light beams, imaging optics, optical imaging devices in the automotive sector, e.g. LED headlights, head up displays, optical micro reflectors, drives for optical storage for optically reading and/or writing of data from and/or onto an optical recording medium, including blue-ray discs.

As will become apparent to a person skilled in the art from the above description, the process according to the present invention can be used both for hot-forming of spherical and aspherical lens bodies and for hot-forming of arbitrary structures having an optical effect, which have a different profile. More preferably, the process according to the present invention is used for hot-forming of cylinder lenses, also lens bodies, which are curved in a first direction and which extend longitudinally in a second direction orthogonal to the first direction, or for hot-forming of diffractive optical elements (DOE). Preferably, the optical element comprises a plurality of diffractive or refractive structures after performing the hot-forming process. These structures can also be separated after the hot-forming process. Generally, these structures having an optical effect after the hot-forming process can also be used for shaping or homogenizing one or plural light beams.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding German application No. 102004021215.5, filed Apr. 29, 2004 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A method for forming an optical element, comprising:

providing a forming tool, a plurality of molding or hot-embossing portions being formed on a surface thereof for molding or hot-embossing structures having an optical effect onto a substrate;

providing said substrate, wherein a plurality of preformed portions are present on a surface of said substrate facing said forming tool;

heating said substrate to a temperature above a transition temperature of a material of said substrate, each of said plurality of preformed portions being opposite to a respective one of said plurality of molding or hot-embossing portions; and pressing said forming tool and said substrate against each other for forming an optical element having a plurality of structures having an optical effect, wherein the shape of the structures having an optical effect is given by the respective associated molding or hot-embossing portion;

wherein when said forming tool and said substrate are pressed against each other, the respective preformed portion of said substrate first of all gets into contact to the associated molding or hot-embossing portion at a central area thereof so that a nip, which is formed between a surface of the respective preformed portion and a surface of the associated molding or hot-embossing portion extends and broadens from said central area towards an edge of the respective preformed portion, and wherein a base of the respective preformed portion is substantially identical with a base of the respectively associated molding or hot-embossing portion to thereby enable a low deformation ratio when deforming a respective preformed portion to a respective structure having an optical effect.

2. The method according to claim 1, wherein said forming tool and said substrate are provided such that the respective preformed portions of said substrate and said associated molding or hot-embossing portions of said forming tool define two respective half spaces and such that:

r1 < r2, wherein r1 is a radius of curvature of the respective molding or hot-embossing portion, which is positive if a center of curvature of the surface of the respective molding or hot-embossing portion lies within that half space, in which said forming tool is disposed, and which is negative, if the center of curvature of the surface of the respective molding or hot-embossing portion lies within the other half-space, and r2 is a radius of curvature of the associated preformed portion, which is negative if a center of curvature of the surface of the respective preformed portion lies within that half space, in which the substrate is disposed, and which is positive if the center of curvature of the surface of the respective preformed portion lies in the other half space, wherein when said forming tool and said substrate are pressed against each other the respective preformed portion is deformed in contact to a surface of the associated molding or hot-embossing portion until said radius of curvature r2 of the respective preformed portion corresponds to the radius of curvature of the associated molding or hot-embossing portion, for forming a structure having an optical effect.

3. The method according to claim 1, wherein said forming tool and said substrate are provided such that said nip continuously broadens from said central area towards an edge of the respective preformed portion.

4. The method according to claim 1, wherein said forming tool and said substrate are provided such that a gas can escape out of said nip towards the edge of the respective preformed portion.

5. The method according to claim 4, wherein said forming tool and said substrate are provided such that at least one longitudinal channel is formed on a surface of one of said forming tool and said substrate outside of the respective molding or hot-embossing portion.

6. The method according to claim 5, wherein said forming tool and said substrate are provided such that a respective longitudinal channel communicates with at least one nip between the surface of said preformed portion and the surface of the associated molding or hot-embossing portion.

7. The method according to claim 1, wherein said forming tool and said substrate are provided such that said nip broadens in a direction in parallel to a surface of said forming tool.

8. The method according to claim 1, wherein said forming tool and said substrate are provided such that said nip broadens in two directions, which are orthogonal to each other and in parallel to a surface of said forming tool.

9. The method according to claim 1, wherein said forming tool and said substrate are provided such that said nip is formed as an annular nip, which broadens from said central area in radial direction and outwards.

10. The method according to claim 1, wherein said substrate, when said optical element is formed by pressing said forming tool and said substrate against each other, is essentially not broadened in a direction transverse to a direction of pressure application.

11. The method according to claim 1, wherein said forming tool and said substrate are provided such that said molding or hot-embossing portions and the associated preformed portion are formed as a protruding portions or as impressions on a surface of the forming tool and of said substrate, respectively.

12. The method according to claim 11, wherein said forming tool and said substrate are provided such that said molding or hot-embossing portions and said associated preformed portions are convexly curved or concavely curved portions on the surface of the forming tool and of said substrate, respectively.

13. The method according to claim 1, wherein said forming tool and said substrate are provided such that a total volume of said molding or hot-embossing portions corresponds to a volume of the associated preformed portion or to the total volume of the associated preformed portions.

14. The method according to claim 1, wherein a clearance between a surface of said substrate and a surface of said forming tool remains at an edge after deforming said respective preformed portion to a structure having an optical effect.

15. The method according to claim 1, wherein said forming tool and said substrate are provided such that said structures having an optical effect and said optical element are at least one of diffractive or refractive.

16. The method according to claim 1, wherein at least one preformed portion is spherically curved and wherein at least one molding or hot-embossing portion is aspherically curved or formed as a free-form surface such that at least one preformed portion is deformed to an aspherically curved optical structure or to an optical structure shaped like a free-form surface.

17. The method according to claim 1, wherein, after the surface of the respective preformed portion has been deformed, a plurality of optical elements are separated by separating sub-portions of said substrate having at least one optical structure formed therein.

18. The method according to claim 1, wherein said forming tool and said substrate are provided such that a form deviation d between said forming tool and said substrate is given by:

$$d > 10 \, \mu m \text{ and}$$

$$d < (200 \, \mu m + D/10);$$

wherein D is a diameter of a molding or hot-embossing portion of said forming tool in microns.

19. A method for forming an optical element, comprising:

providing a forming tool, a plurality of molding or hot-embossing portions being formed on a surface thereof for molding or hot-embossing structures having an optical effect onto a substrate;

providing said substrate such that at least one preformed portion is present on a surface of said substrate facing said forming tool, said at least one preformed portion being opposite to all molding or hot-embossing portions;

heating said substrate to a temperature above a transition temperature of a material of said substrate; and pressing said forming tool and said substrate against each other for forming an optical element having a plurality of structures having an optical effect, wherein the shape of the structures having an optical effect is given by the respective associated molding or hot-embossing portion;

wherein when said forming tool and said substrate are pressed against each other, the respective preformed portion of said substrate first of all gets into contact to the forming tool at a planar portion of a central area thereof so that a nip, which is formed between a surface of the respective preformed portion and a surface of said forming tool extends and broadens from said central area towards an edge of said substrate, and wherein said substrate and said forming tool are provided with a substantially identical base to thereby enable a low deformation ratio when deforming a respective preformed portion to a respective structure having an optical effect.

20. The method according to claim 19, wherein said substrate, when said optical element is formed by pressing said forming tool and said substrate against each other, is essentially not broadened in a direction transverse to a direction of pressure application.

21. The method according to claim 19, wherein said substrate is a planar substrate.

22. The method according to claim 1, wherein said substrate is a planar substrate.

* * * * *

UNITED STATES PATENT AND TRADEMARK OFFICE
CERTIFICATE OF CORRECTION

PATENT NO. : 7,611,648 B2
APPLICATION NO. : 11/115415
DATED : November 3, 2009
INVENTOR(S) : Wölfing et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1165 days.

Signed and Sealed this

Twelfth Day of October, 2010

David J. Kappos
*Director of the United States Patent and Trademark Office*